(12) United States Patent
Jarosz

(10) Patent No.: US 6,494,380 B2
(45) Date of Patent: Dec. 17, 2002

(54) IC CARD HAVING FINGERPRINT SENSOR DESIGNED TO WITHSTAND BENDING

(75) Inventor: Hervé Jarosz, Eragny (FR)

(73) Assignee: Sagem SA, Paris (FR)

( * ) Notice: Subject to any disclaimer, the term of this patent is extended or adjusted under 35 U.S.C. 154(b) by 12 days.

(21) Appl. No.: 09/757,835

(22) Filed: Jan. 11, 2001

(65) Prior Publication Data

US 2001/0008004 A1 Jul. 12, 2001

(30) Foreign Application Priority Data

Jan. 11, 2000 (FR) .............................. 00 00283

(51) Int. Cl.[7] .............................................. G06K 19/00
(52) U.S. Cl. ....................... 235/487; 235/380; 235/451; 235/492
(58) Field of Search .................. 235/451, 380, 235/487, 492

(56) References Cited

U.S. PATENT DOCUMENTS

| | | | |
|---|---|---|---|
| 4,353,056 A | | 10/1982 | Tsikos |
| 4,577,345 A | | 3/1986 | Abramov |
| 4,582,985 A | | 4/1986 | Löfberg |
| 4,804,828 A | * | 2/1989 | Oogita ...................... 235/1 D |
| 5,325,442 A | | 6/1994 | Knapp |
| 5,401,688 A | * | 3/1995 | Yamaji et al. ............... 437/209 |
| 5,786,988 A | * | 7/1998 | Harari ......................... 361/749 |
| 5,920,640 A | | 7/1999 | Salatino et al. |
| 5,978,496 A | | 11/1999 | Harkin |
| 6,133,957 A | * | 10/2000 | Campbell .................... 348/458 |
| 6,360,953 B1 | * | 3/2002 | Lin et al. ..................... 235/380 |
| 6,209,790 B1 | * | 4/2002 | Houdeau et al. ............ 235/491 |

FOREIGN PATENT DOCUMENTS

| | | |
|---|---|---|
| GB | 2 243 235 | 10/1991 |
| WO | WO 94/25938 | 11/1994 |
| WO | WO 00/28701 | 6/1999 |

* cited by examiner

*Primary Examiner*—Michael G. Lee
*Assistant Examiner*—Daniel A. Hess
(74) *Attorney, Agent, or Firm*—Larson & Taylor, PLC

(57) ABSTRACT

A chip card comprising a card made from a plastics material (1) capable of elastically withstanding a relative bending and in which a microelectronic data processing chip (4) is encased, a thin microelectronic wafer (5) made from a semiconductor material, such as a finger print sensor, additionally being joined to the card (1). Said wafer (5) is sub-divided into a small number of juxtaposed chips (7) disposed in a given pattern and separated from one another by a predetermined distance (d) which is sufficient for each separating strip (8) of plastics material to be slightly bent without causing adjacent chips (7) to become unstuck and/or rupture; electrical links are established between the chips to provide electrical continuity.

10 Claims, 3 Drawing Sheets

IC CARD HAVING FINGERPRINT SENSOR DESIGNED TO WITHSTAND BENDING

FIELD OF THE INVENTION

The invention relates to improvements made to chip cards comprising a card made from a plastics material with a relative elastic bending capacity and encasing a microelectronic data processing chip, a thin microelectronic wafer of semiconductor material additionally being joined to the card of plastics material.

DESCRIPTION OF THE PRIOR ART

Such a card, made from a plastics material, can withstand a relative degree of bending without breaking. As a result of the reduced dimensions of the chip relative to the dimensions of the card, a certain degree of bending in the card will not, as a rule, cause the chip to rupture and/or become unstuck.

The same does not apply to a very thin microelectronic silicon wafer, which is highly susceptible to breaking and of relatively large dimensions: accordingly, bending of the plastics card will run the risk of this wafer breaking and/or becoming unstuck.

In practice, this problem may arise in particular with finger print sensors: a known chip card is provided with a finger print sensor, which can be connected so as to co-operate with the chip (which generally incorporates a microprocessor), so that the user of the card can be identified by running a comparison of the finger prints detected by the finger print sensor with finger prints previously stored in a memory, in particular in a memory of the microelectronic chip. The silicon wafer constituting a finger print sensor must be large enough for a print of the greater part of the bottom surface of the first joint of a finger (often the index finger) to be applied to it: to be more specific, the dimensions of such a sensor may be approximately 10 to 20 mm by approximately 10 to 20 mm.

A great deal of development work is being done on this type of chip card provided with a finger print sensor, in particular with a view to replacing chip cards operated using a confidential alphanumeric code, for example as access cards or banking cards.

SUMMARY OF THE INVENTION

An object of the invention is substantially to propose an improved design of chip card fitted with a thin microelectronic wafer which better meets practical requirements, in particular as regards its strength over time, even if the plastics card is subjected to a relative degree of bending, without significantly increasing the complexity of the manufacturing process or significantly increasing manufacturing costs.

To this end, the invention proposes a chip card of the type described above, wherein:
- said wafer is sub-divided into a small number of juxtaposed chips, disposed in a given pattern,
- said chips are separated from one another by a predetermined distance which is large enough for each separating strip of plastics material to be subjected to a slight degree of bending without causing adjacent chips to become unstuck and/or break, and
- electrical links are established between the chips to provide electrical continuity.

As a result of this arrangement, the joining surface of the thin silicon wafer, which is fragile, is sub-divided and the adjacent chips are separated from one another by separating strips capable of absorbing any bending to which the card is subjected. In order to meet this requirement without imposing any risk, it is desirable for the distance between the facing edges of two chips to be substantially equal to at least 1 mm.

Generally speaking, each chip may be of an approximate rectangular shape with four corners and the chips are disposed with their respective edges substantially parallel. In practice, the chips are aligned in substantially perpendicular rows and columns or alternatively arranged on diagonals.

There is no need for the wafer to be highly sub-divided in order to achieve the desired result: it is sufficient for the chips to be disposed in two to four rows and/or in two to four columns, depending on the size of the chips.

In one example of a preferred application, the thin wafer is a finger print sensor which is electrically connected to the microelectronic chip. This being the case, it is of advantage to provide interpolation means—for example co-operating with or incorporated in the microelectronic chip and electrically connected to the finger print sensor—capable of reconstructing a full image of finger prints by an interpolation process, including in the zones corresponding to the strips separating the chips; the interpolation algorithm is adapted to the size of the area separating the chips and this dimension must therefore be as small as possible to render detection as faithful as possible. In this context, the space between chips may be between 1 and 1.5 mm, typically about 1 mm, which strikes what appears to be an acceptable compromise between a relative deformability of the card in the spaces between chips and the reliability of the process of detecting and reconstituting finger prints by interpolation.

In a preferred practical embodiment, the finger print sensor is of the capacitive type, incorporating a high plurality of elementary micro-capacitors; each chip incorporates a plurality of such micro-capacitors arranged in a network; and the electrical links between chips provide the electrical continuity between the networks of elementary micro-capacitors belonging to two adjacent chips.

BRIEF DESCRIPTION OF THE DRAWINGS

The invention will be more readily understood from the detailed description below, given by way of example and not restrictive in any respect and with reference to the appended drawings, in which.

DETAILED DESCRIPTION OF THE INVENTION

Figure 1:
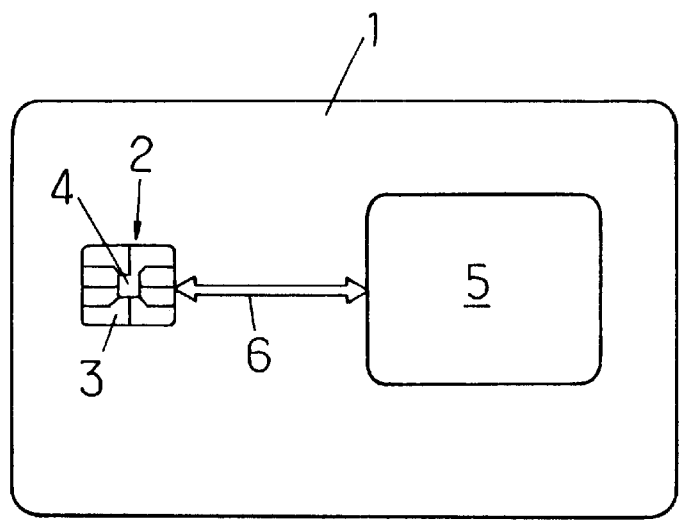
FIG. 1 is a schematic view illustrating the general layout of a chip card of the type proposed by the invention, which is provided with a thin microelectronic wafer.

Turning firstly to FIG. 1, a chip card as proposed by the invention comprises a card 1 made from a plastics material, which is thin and has a relative deformability to allow it to be curved or bent slightly, both longitudinally and transversely, and even allowing it to withstand a slight degree of torsion. Encased in this card is a microelectronic module 2, comprising a mask 3 made up of a set of contacts disposed around a central zone occupied by a microelectronic chip 4 (generally incorporating a microprocessor) capable of processing data, linking wires (not visible) connecting the card 1 to the respective contacts.

So that the card can be used for the specific purpose intended, a thin microelectronic wafer 5 may be encased in the plastics card in the same way as the micro-module 2.

The wafer 5 may be connected by wires (not visible) to the microelectronic chip 4 (this link is diagrammatically indicated by the double arrow 6), to enable the chip 4 to manage operation of the wafer 5.

The wafer 5, provided in the form of a thin silicon wafer, is therefore very susceptible to breaking and its relatively large dimensions are such that it is not able to conform to the potential curvature, slight though it might be, which the plastics card to which it is joined is capable of withstanding.

Although the invention is not limited to this particular example of an application, the wafer 5 may be a finger print sensor integrated in the card to enable the user of the card (bank card, access card, . . . , for example) to be authenticated and it is more particularly on this application that the description below will concentrate.

Figure 2:
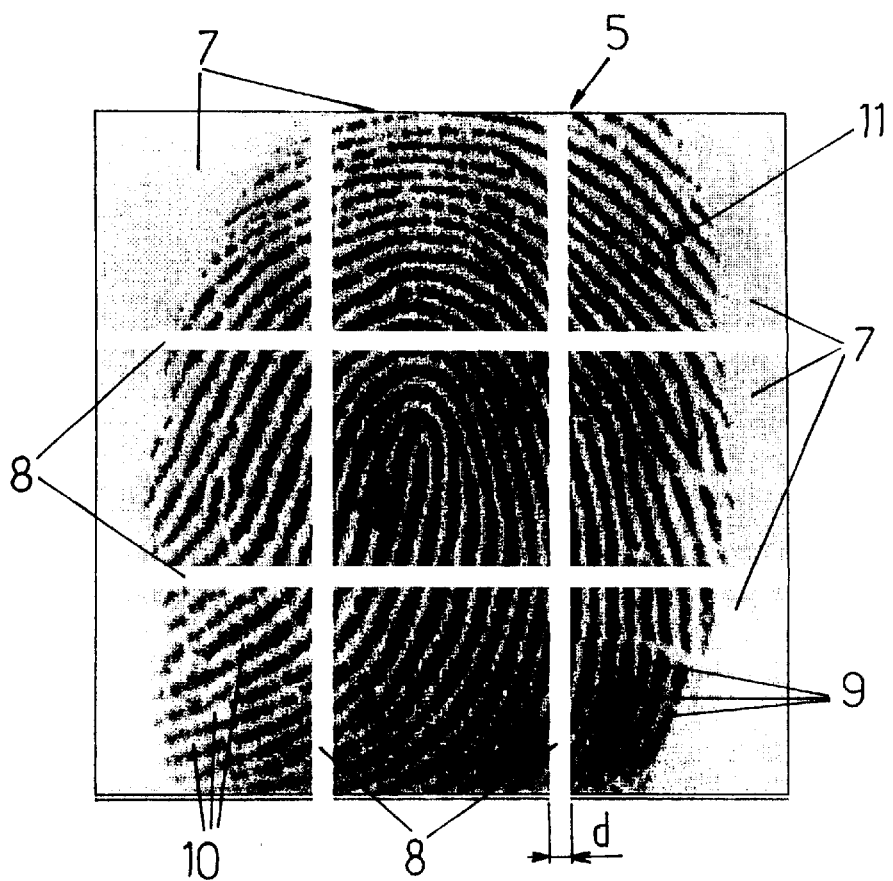
FIG. 2 is a view on an enlarged scale illustrating an embodiment of a finger print sensor designed as proposed by the invention.

To enable the plastics card and the silicon wafer of the finger print sensor joined thereto to co-operate in a reliable manner, the wafer 5 is sub-divided, as illustrated in FIG. 2, into several chips 7 separated from one another by a distance 8. To secure a certain degree of deformability, slight though it might be, in the region of the sensor 5, the free spaces 8 will of a dimension d which is not less than approximately 1 mm.

Moreover, in order to produce a continuous image of the finger prints in spite of the spaces 8, an interpolation algorithm is used which is adapted to the size of the spaces 8; however, so that the prints can be reliably reconstituted and the characteristic points (nodes, forks, . . . ) of a print can be reliably detected in a sufficient number (detection of 14 characteristic points to authenticate a person, for example), it is desirable that the width of the spaces 8 should not be excessive and should not exceed the 1 mm mentioned above by much.

This being the case, spaces of a width in the order of 1 to 1.5 mm seem to represent an acceptable compromise. In practice, a value of approximately 1 mm will be adopted, as illustrated in FIG. 2 and the subsequent drawings.

To provide a clearer understanding, FIG. 2 illustrates the image of a finger print 11 of a finger (the dark lines 9 corresponding to the salient or upstanding crests whilst the light lines 10 correspond to the troughs or hollows of the print) superimposed on the simplified drawing of the sensor 5.

The sensor does not need to be highly sub-divided in order to achieve the desired result proposed by the invention—namely to avoid rupture and/or unsticking of the silicon wafer incorporated in the sensor: it is sufficient to sub-divide it into a small number of chips 7 separated by a few spaces 8 so that any bending in this region of the plastics card 1 will be transmitted to the spaces 8 only.

Generally speaking, this objective is achieved by disposing the chips 7 in a given layout, in rows and/or in columns and/or along diagonals, numbering two to four in particular, so that the spaces 8 form a crisscross network capable of absorbing any bending and/or a slight torsion in the card; accordingly, the number of spaces in each direction may be between one and three.

In particular, the chips 7 may simply be of an approximately rectangular shape with four corners and disposed with their respective edges substantially parallel.

In the example illustrated in FIG. 2, the chips 7 are disposed in substantially orthogonal rows and columns with three chips in each direction, defining a network of two by two orthogonal spaces 8. In the example illustrated, each chip 7 is a square with a side of approximately 5 mm and the spaces 8 are approximately 1 mm wide.

As may be seen, the sensor 5 thus laid out receives almost the entire surface of the finger print 11. It may be noted that the central chip 7 receives the central zone of the print 11, this central zone containing the largest number of characteristic points of the print 11.

The outer halves of the peripheral chips 7, on the other hand, are not fully covered by the print, but are covered by zones of the print which contain only a minimum number of characteristic points and are therefore not essential for authentication purposes.

This being the case, the surface area of the sensor can be reduced in order to reduce the cost, conserving only regions corresponding to the most useful zones of the print (i.e. those containing the most characteristic points).

Figure 3:
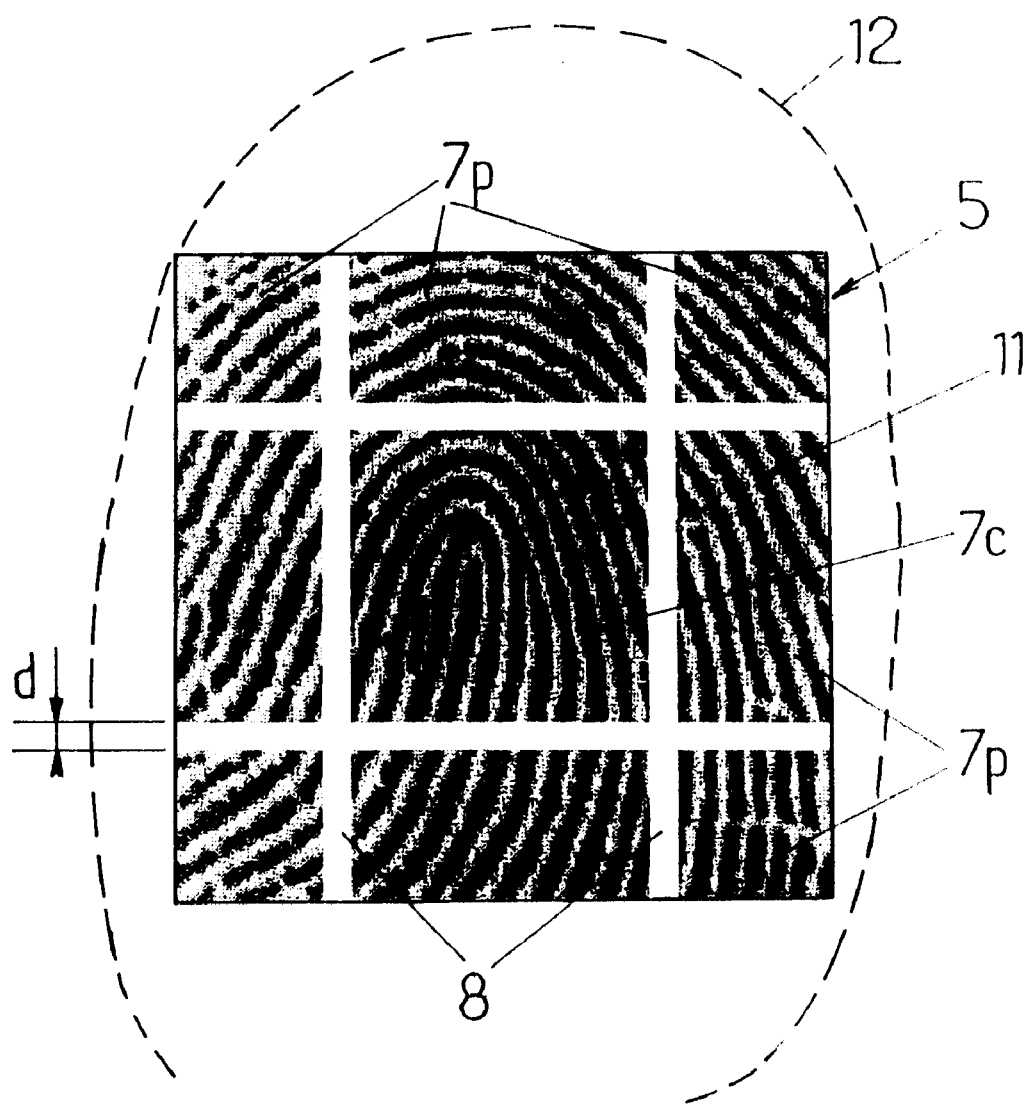
FIGS. 3 to 5 are schematic views illustrating other possible embodiments of the sensor.

A first solution, illustrated in FIG. 3, may consist in providing the sensor 5 by combining chips of different dimensions: the central chip 7 is of the same dimensions as the central chip illustrated in FIG. 2 (for example square with a side of 5 mm) to cover the central zone of the print 11, whilst the peripheral chips 7p are of reduced dimensions which better correspond to the exact contour of useful zones (with a relatively high number of characteristic points). The contour 12 of the finger print 11 is illustrated by broken lines. In this example, each peripheral chip 7p is reduced by half across one of its dimensions, which makes for a considerable saving in material. Furthermore, the reduced surface area of these peripheral chips 7p reduces the risk of damage (breakage and/or unsticking) if the base is subjected to bending. Otherwise, the layout of the chips 7 is still an orthogonal layout similar to that illustrated in FIG. 2.

Figure 4:
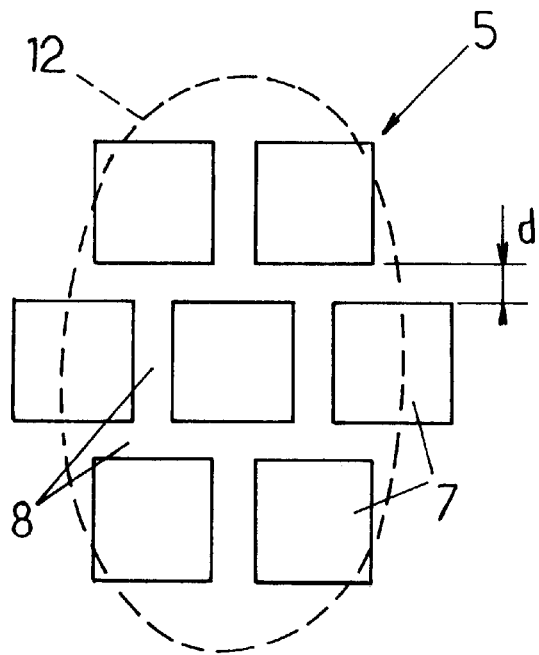

In FIG. 4, the chips 7 are still aligned in rows but these rows are mutually offset from one another. Accordingly, if the central row is also made up of three chips as in the layouts illustrated in FIGS. 2 and 3, the two top and bottom rows each have only two chips. In this arrangement, the chips 7 are all identical and similar to those illustrated in FIG. 2 (for example, square with a 5 mm side) and are separated from one another by spaces d of approximately 1 mm. The contour 12 of the print is shown in broken lines. This network of chips is disposed to conform as closely as possible to the contour of the print: the central chip picks up the central area of the print whilst at least the greater part of the peripheral chips is simultaneously covered. This saves on two chips as compared with the network illustrated in FIG. 2.

Figure 5:
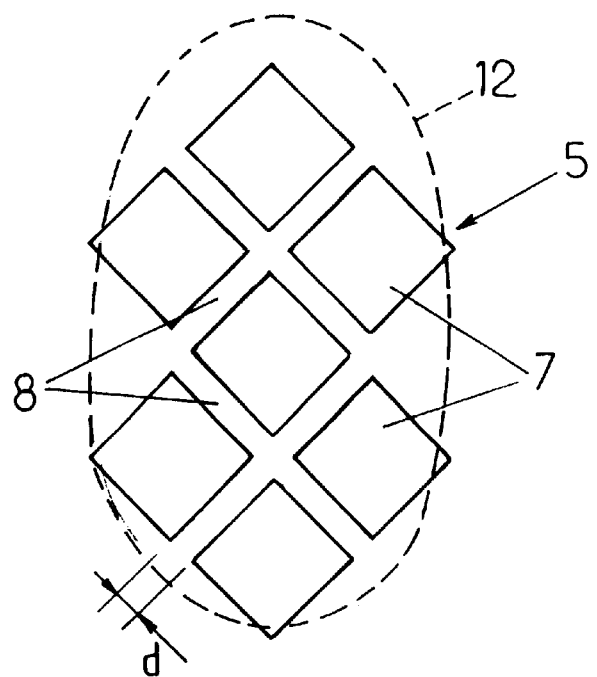

Clearly, numerous layouts would be conceivable as a means of setting up the network of chips 7, both in an orthogonal layout and in other patterns, for example diagonal as illustrated in FIG. 5.

The chips are electrically connected to one another by links (not illustrated) designed to provide electrical continuity, conferring on the mosaic of chips 7 an operating capacity akin to that of a monobloc sensor.

Although the print sensor 5 may be of any appropriate type known to the person skilled in the art, it is, however, of advantage if, in a manner known per se, the sensor is of the capacitive type incorporating a high plurality of elementary micro-capacitors; each sub-divided chip 7 of the sensor 5 will therefore have a plurality of such micro-capacitors laid out in a network and the electrical links provided between adjacent chips will provide electrical continuity of the networks of micro-capacitors (continuity of the rows and/or the columns of capacitors).

What is claimed is:

1. A chip card comprising a card of a plastics material which is capable of elastically withstanding a relative curvature, in which a microelectronic data processing chip is encased and to which a thin microelectronic wafer of a semiconductor material is affixed, said wafer being sub-divided into a smaller number of juxtaposed chips disposed in a given layout with electrical links joining said juxtaposed chips so as to provide electrical continuity therebetween, and said juxtaposed chips being separated from one another so that adjacent chips are separated from each other by a separating strip of said plastics material the separating strip separating said adjacent chips from each other being of a predetermined width and said width being such as to permit each said separating strip of plastics material to be subjected to a bending corresponding to the relative curvature which the card of plastics material is capable of elastically withstanding, without causing said adjacent chips to become unstuck and/or break.

2. The chip card according to claim 1, wherein said distance between the facing edges of two juxtaposed chips is substantially equal to 1 mm.

3. The chip card according to claim 1, wherein each chip is of an approximately rectangular shape with four corners, and wherein the juxtaposed chips are disposed with their respective edges substantially parallel.

4. The chip card according to claim 1, wherein the juxtaposed chips are aligned in substantially perpendicular rows and columns.

5. The chip card according to claim 1, wherein the layout includes diagonals and the juxtaposed chips are arranged along said diagonals.

6. The chip card according to claim 1, wherein the juxtaposed chips are arranged in two to four rows.

7. The chip card according to claim 1, wherein the juxtaposed chips are disposed in two to four columns.

8. The chip card according to claim 1, wherein the thin wafer is a finger print sensor which is electrically connected to the microelectronic chip.

9. The chip card according to claim 8, wherein the microelectronic chip, electrically connected to the finger print sensor, has interpolation means capable of reconstructing a full image of finger prints by a process of interpolation, including interpolation of areas corresponding to the strips separating the juxtaposed chips.

10. The chip card according to claim 8, wherein the finger print sensor is of capacitive type incorporating a plurality of elementary micro-capacitors, wherein each juxtaposed chip includes a plurality of said micro-capacitors laid out in a network, and wherein the electrical links between the juxtaposed chips provide electrical continuity between the networks of elementary micro-capacitors belonging to two juxtaposed chips.

* * * * *